US012794670B2

(12) United States Patent
Morais

(10) Patent No.: US 12,794,670 B2
(45) Date of Patent: Nov. 10, 2026

(54) LATENCY AND COMPUTATIONAL PERFORMANCE ON A BLOCKCHAIN

(71) Applicant: PayPal, Inc., San Jose, CA (US)

(72) Inventor: Antony Amalraj Morais, Chennai (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/979,416

(22) Filed: Dec. 12, 2024

(65) Prior Publication Data

US 2025/0211424 A1 Jun. 26, 2025

Related U.S. Application Data

(63) Continuation of application No. 17/517,977, filed on Nov. 3, 2021, now Pat. No. 12,200,109.

(51) Int. Cl.
*H04L 9/06* (2006.01)
*G06F 9/46* (2006.01)
(Continued)

(52) U.S. Cl.
CPC ............ *H04L 9/0643* (2013.01); *G06F 9/467* (2013.01); *H04L 9/0869* (2013.01); *H04L 9/3297* (2013.01); *H04L 9/50* (2022.05)

(58) Field of Classification Search
CPC ... H04L 9/0643; H04L 9/0869; H04L 9/3297; H04L 9/50; H04L 2209/56; G06F 9/467;
(Continued)

(56) References Cited

U.S. PATENT DOCUMENTS 10,939,405 B1 * 3/2021 Haleem ................ H04W 12/63
2015/0332283 A1 11/2015 Witchey
(Continued)

FOREIGN PATENT DOCUMENTS

CN 112799636 A 5/2021
KR 20190093012 A 8/2019
(Continued)

OTHER PUBLICATIONS

Binance Academy, "Mempool", Oct. 21, 2020 (Year: 2020).*
(Continued)

*Primary Examiner* — Lynn D Feild
*Assistant Examiner* — Ethan V Vo
(74) *Attorney, Agent, or Firm* — HAYNES AND BOONE, LLP

(57) ABSTRACT

Blockchain latency is improved by unclogging a mempool, which frees up electronic memory and reduces CPU usage and network bandwidth. Mining data of one or more initial blocks of a blockchain is accessed. The mining data reveals, for each miner, the time delay between individual transactions mined by that miner. A subset of miners is then determined to have lower time delays than miners not in the subset. Thereafter, a different random number is generated for each new block of the blockchain system to be mined. Based on a comparison of this random number and a predefined threshold, either an exploitation phase or an exploration phase is entered for the mining of each new block. In the exploitation phase, mining tasks are assigned only to the subset of the miners. In the exploration phase, mining tasks are assigned to both miners within the subset and miners not in the subset.

20 Claims, 11 Drawing Sheets

(51) Int. Cl.

| | |
|---|---|
| ***H04L 9/00*** | (2022.01) |
| ***H04L 9/08*** | (2006.01) |
| ***H04L 9/32*** | (2006.01) |

(58) Field of Classification Search

CPC ............ G06N 3/084; G06N 5/01; G06N 7/01; G06N 20/10; G06N 20/20

See application file for complete search history.

(56) References Cited

U.S. PATENT DOCUMENTS

| | | | | |
|---|---|---|---|---|
| 2016/0330034 | A1* | 11/2016 | Back | G06Q 20/065 |
| 2018/0107958 | A1* | 4/2018 | Konik | G06Q 10/0637 |
| 2018/0109541 | A1* | 4/2018 | Gleichauf | H04W 12/06 |
| 2019/0303363 | A1* | 10/2019 | Leung | G06F 9/5044 |
| 2019/0333048 | A1* | 10/2019 | DiCross | G06Q 50/01 |
| 2020/0026699 | A1 | 1/2020 | Zhang | |
| 2020/0160326 | A1 | 5/2020 | Sarin | |
| 2020/0175503 | A1* | 6/2020 | Sarin | G06Q 20/3678 |
| 2020/0183917 | A1 | 6/2020 | Duchastel | |
| 2021/0135847 | A1* | 5/2021 | Manevich | G06F 16/9014 |
| 2021/0176058 | A1 | 6/2021 | Cheng | |
| 2021/0192619 | A1* | 6/2021 | Wu | G06Q 20/0655 |
| 2021/0266174 | A1* | 8/2021 | Snow | A61J 1/06 |
| 2022/0405748 | A1* | 12/2022 | Coughlan | G06Q 20/3827 |

FOREIGN PATENT DOCUMENTS

| | | | |
|---|---|---|---|
| WO | 2020126025 | A1 | 6/2020 |
| WO | 2020227984 | A1 | 11/2020 |

OTHER PUBLICATIONS

Geeksforgeeks, “Epsilon-Greedy Algorithm in Reinforcement Learning”, May 14, 2020, Retrieved from Internet Archive (Year: 2020).*

Jeremy Jordan, “Hyperparameter Tuning for Machine-Learning Models”, Dec. 5, 2019, Retrieved from Internet Archive (Year: 2019).*

Li B, Lu Q, Jiang W, Jung T, Shi Y. A mining pool solution for novel proof-of-neural-architecture consensus. In2021 IEEE International Conference on Blockchain and Cryptocurrency (ICBC) May 3, 2021 (pp. 1-3). IEEE. (Year: 2021).*

Bae J, Lim H. Random mining group selection to prevent 51% attacks on bitcoin. In2018 48th Annual IEEE/IFIP International Conference on Dependable Systems and Networks Workshops (DSN-W) Jun. 25, 2018 (pp. 81-82). IEEE. (Year: 2018).

Gracy M, Jeyavadhanam Br. A systematic review of blockchain-based system: Transaction throughput latency and challenges. In2021 International Conference on Computational Intelligence and Computing Applications (ICCICA) Nov. 26, 2021 (pp. 1-6). IEEE. (Year: 2021).

International Search Report and Written Opinion for Application No. PCT/US2022/047755 mailed on Feb. 24, 2023, 11 pages.

Liu X, Wang W, Niyato D, Zhao N, Wang P. Evolutionary game for mining pool selection in blockchain networks. IEEE Wireless Communications Letters. Mar. 27, 2018;7(5):760-3. (Year: 2018).

Nguyen DC, Ding M, Pathirana PN, Seneviratne A, Li J, Poor HV. Cooperative task offloading and block mining in blockchain-based edge computing with multi-agent deep reinforcement learning. IEEE Transactions on Mobile Computing. Oct. 14, 2021;22(4). (Year: 2021).

Uddin MA, Stranieri A, Gondal I, Balasubramanian V. An efficient selective miner consensus protocol in blockchain oriented IoT smart monitoring. In2019 IEEE International Conference on Industrial Technology (ICIT) Feb. 13, 2019 (pp. 1135-1142). IEEE. (Year: 2019).

Australian Patent Application No. 2022382648, Australian Intellectual Property Office, Notice of acceptance for patent application, dated Feb. 10, 2025, 3 pages.

Andreas M Antonopoulos: “Mastering Bitcoin”, , Jul. 21, 2017 (Jul. 21, 2017), XP055570487, ISBN: 978-1-4919-5438-6 Retrieved from the Internet: URL:https://www.oreilly.com/library/view/m astering-bitcoin-2nd/9781491954379/ [retrieved on Mar. 18, 2019] * Chapter 10 *.

European Patent application No. 22890624.4, European Patent Office, Extended European search report, dated Aug. 20, 2025, 8 pages.

* cited by examiner

LATENCY AND COMPUTATIONAL PERFORMANCE ON A BLOCKCHAIN

CROSS REFERENCE TO RELATED APPLICATION

The present invention is a Continuation of U.S. patent application Ser. No. 17/517,977, filed Nov. 3, 2021, the disclosure of which is incorporated by reference in its entirety.

BACKGROUND

Field of the Invention

The present disclosure generally relates to blockchain technology, and hardware and software related thereto. More specifically, the present disclosure relates to systems and methods for identifying miners that incur less delay between individual ones of its mined transactions for one or more initial blocks of a blockchain, and leveraging these miners to perform the mining of subsequent blocks of the blockchain.

Related Art

Rapid advances have been made in the past several decades in the fields of computer technology and telecommunications, and businesses and end users now engage in electronic activities more than ever. Recently, blockchain technology has been introduced to improve the security of electronic transactions. A blockchain system may comprise a growing list of records (also called blocks) that are linked together using cryptography. Compared to conventional systems, blockchain systems are more resistant to the modification of the data stored in the blocks and therefore offers protection against hacking.

However, existing blockchain systems may still have various shortcomings. For example, blockchain systems may have a mempool, which is a temporary electronic storage place, that contains a list of transactions that have not been written to the main blockchain system yet. These blockchain transactions are mined by miners that stake coins as collateral for the mining. Miners are compensated with a transaction fee (also referred to as a gas fee) for mining the blockchain transactions. The transaction fees may vary from transaction to transaction. Unfortunately, some miners will only mine transactions that have sufficiently high transaction fees. As a result, the lower-fee transactions are at least temporarily stuck in the mempool and waiting an unnecessarily long time for a miner's approval to be written into the blockchain. This in turn leads to a delay in the processing of subsequent blockchain transactions, which may waste blockchain resources and/or degrade the efficiency of the blockchain.

More particularly, Applicant recognizes that computational performance, memory usage, and latency can be improved for one or more computer systems participating in blockchain operations. Thus, what is needed is a system and method to automatically identify the blockchain miners that have less delay between their individual transactions, and leverage these miners to perform blockchain mining for subsequent blocks accordingly.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1A:
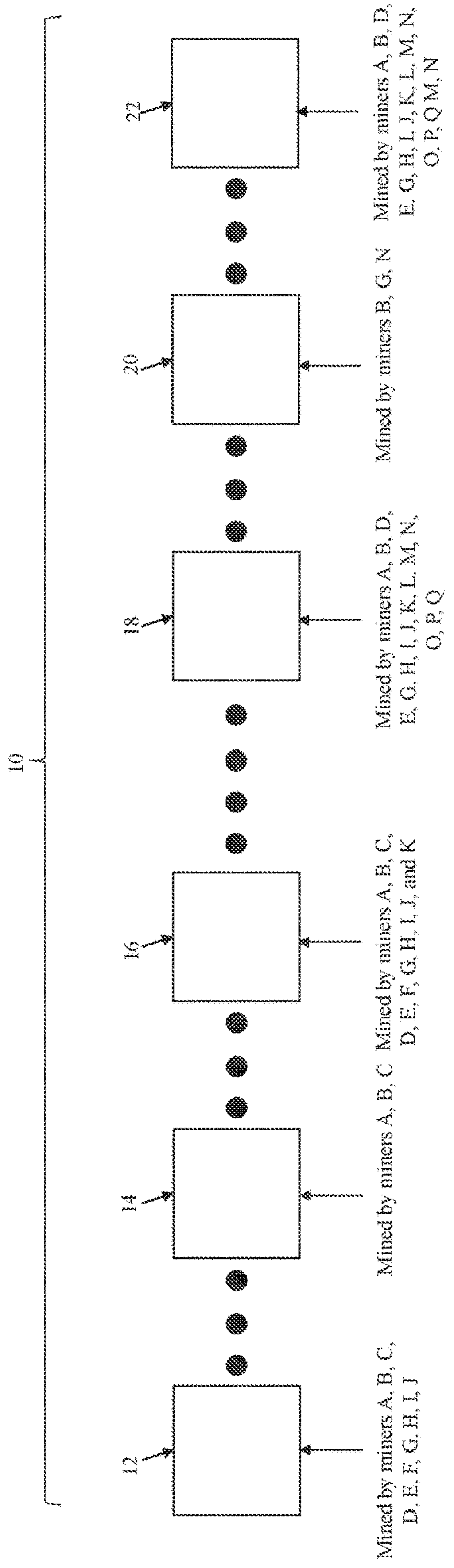
FIG. 1A illustrates a simplified process flow for mining an example blockchain according to various aspects of the present disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made without departing from the scope described herein. Various aspects are capable of other embodiments and of being practiced or being carried out in various different ways.

Technical benefits of the techniques discussed below include improving latency, CPU efficiency, and memory usage for computers engaged in blockchain operations. For example, blockchain systems utilize memory pools (referred to as mempool) as a temporary electronic storage place to store pending transactions before the pending transactions are processed from the mempool and processed by a blockchain miner. The mempool may be configured using physical electronic memory, such as using a part of a hard disk or Random Access Memory (RAM) of a computer. If the pending transactions are not processed sufficiently fast from the mempool, the mempool can get jammed or clogged. Since computational resources (e.g., CPU power) are needed to maintain and monitor the mempool (e.g., by having to periodically monitor the transactions temporarily stored in the mempool), the clogging of the mempool leads to a waste of electronic resources. Unfortunately, existing blockchain systems often have poor latency caused by certain tendencies of blockchain miners, which leads to the clogging of the mempool and the aforementioned waste of electronic resources.

The present disclosure implements various approaches to identify a subset of blockchain miners that have improved efficiency in mining the blockchain transactions, and leveraging this subset of blockchain miners to perform the blockchain mining subsequently. By doing so, the pending transactions are processed from the mempool at a sufficiently fast rate to avoid the clogging of the mempool. As physical electronic memory of the mempool is being freed up faster by the faster processing of the pending transactions by the subset of the blockchain miners, less computational resources (e.g., hard disk or RAM) need to be dedicated to the maintenance of the mempool. In addition, less CPU power is needed to periodically monitor the operation and maintenance of the now-smaller (e.g., containing fewer pending transactions) mempool. Furthermore, as the improved mempool herein contains fewer transactions, the retrieval of the transactions from the mempool may be performed faster, which again leads to a reduction in CPU usage.

The faster processing of the blockchain transactions further reduces the waste of electronic resources, because it leads to fewer cancelled transactions. In that regard, transactions stuck at the mempool for a long time may eventually be canceled by their originators. Since the origination of a transaction and the subsequent cancellation of the transaction both require computational resources (e.g., CPU power, electronic memory storage, electronic power consumption) and network resources (e.g., the routing of data packets), the clogging of the mempool (which may lead to the cancellation of transactions stuck in the mempool) results in a waste of the computational and network resources. Here, the transactions are processed from the mempool at a sufficiently fast rate, and therefore they are unlikely to be cancelled. Therefore, computational resources and network resources are not needlessly wasted.

Furthermore, the various approaches of the present disclosure identify and subsequently leverage a preferred subset of the miners to perform the blockchain mining. Since each blockchain miner corresponds to one or more energy-consuming machines to perform the blockchain mining, using fewer miners to perform the mining according to the various aspects of the present disclosure will also reduce the total amount of energy consumed in blockchain mining.

The various approaches of the present disclosure to improve the latency of the mempool offers another benefit in terms of network security. For example, in a 51% attack scenario, a group of malicious actors (who know one another beforehand) may act together as blockchain miners to control over 50% of a blockchain network's mining hash rate. When this occurs, these malicious actors may be able to prevent new transactions from being confirmed, which then allows the malicious actors to halt payments between some or all users, or even reverse or otherwise alter transactions. Here, the various approaches of the present disclosure involve randomizing the miners to participate in the blockchain mining, and such randomization prevents the malicious actors from knowing who the miners will be for any given block of the blockchain system. As such, the 51% attack cannot be successfully perpetrated, and in turn, the security and integrity of the blockchain system are improved, as will be discussed below in more detail.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, cash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others, the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Identification of Top Miners

FIG. 1A is a block diagram that illustrates a process of identifying top miners in a blockchain system 10 according to embodiment of the present disclosure. The blockchain system 10 includes a plurality of blocks, some examples of which are illustrated herein as blocks 12, 14, 16, 18, 20, and 22. The implementation and/or the contents of the blocks 12-22 are described in more detail below with reference to FIG. 3. For purposes of the present disclosure, it is understood that the blocks 12-22 each contain a plurality of blockchain transactions (e.g., stored in a mempool until written into the blockchain), and that the blocks 12-22 are to be mined sequentially by a plurality of miners of the blockchain system 10. In that regard, the miners are entities that stake coins (or other suitable form of assets) as collateral for participating in the mining operations (e.g., in Ethereum). Based on the amount or percentage of coins staked, the miners get to mine the transactions in the blocks 12-22 accordingly, and as a reward, the miners each get paid a gas fee for each respective mined transaction. However, the gas fee may vary from transaction to transaction. Some miners therefore will only mine transactions with a sufficiently high gas fee and ignore transactions with low gas fees. When many miners are acting in this manner, this will cause the lower-fee transactions to be temporarily (or even permanently) stuck in the mempool for a longer-than-necessary amount of time, which in turn leads to a delay in (or even lack of) processing the subsequent blockchain transactions as well.

The present disclosure overcomes the above problem by identifying a list of top miners that have less time delay than other miners based on their performance in mining one or more initial blocks of the blockchain, and then leveraging these top miners to mine the subsequent blocks of the blockchain. Since the top miners incur less time delay between the individual ones of the mined transactions (e.g., they may be less likely to ignore low fee transactions), the subsequent blocks mined by the top miners will be more efficient and have less delay.

In addition, unbeknownst to the miners, an exploitation phase or an exploration phase for the mining of each block may be randomly entered. In the exploitation phase, the blockchain transactions for that block will be mined disproportionately (e.g., exclusively in some embodiments) by the top miners. In the exploration phase, the blockchain transactions for that block will be mined both by the top miners as well as miners that are not yet on the list of identified top miners (e.g., by all available miners). Based on the mining performance (e.g., time delay between the processing of individual transactions) of the miners in the exploration phase, the list of top miners is updated by replacing at least some miners who are no longer performing well (e.g., miners who were initially on the list of top miners, but who have demonstrated more time delay during the exploration phase) with new miners who are performing better. The new and updated list of miners are then used to mine the subsequent blocks when the exploitation phase is entered again.

By switching back and forth between the exploitation phase and the exploration phase, the present disclosure allows for efficient mining during the exploitation phase, while also ensuring that the top miners do not become complacent, since the top miners will still be replaced by other more efficient miners when the performance of the top miners degrades during the exploration phase. In this manner, a miner cannot take advantage of the system simply by performing well (e.g., having short delays between transactions) only during the initial stage and then reverting to suboptimal behavior (e.g., having longer-than-necessary delays between transactions) once it made the list of top miners. The random nature of entering the exploitation phase and exploration phase means that the miners do not know the identities of other miners, which helps to prevent potential electronic attacks (e.g., a 51% attack) against the blockchain, as discussed below in more detail.

With reference to FIG. 1A, a simplified example of the process flow of the present disclosure is illustrated via the mining of the blocks 12-22. For example, the block 12 may be the first block (also referred to as the initial block or the genesis block) of the blockchain system 10. At this stage, suppose that all the available miners (e.g., the miners who have staked sufficient coins or other assets) are miners A, B, C, D, E, F, G, H, I, and J. As the block 12 is mined, the miners A-J may have varying amounts of time delays between the individual ones of the transactions mined by each miner, respectively. The amount of time delays may be attributed to the respective miner's decision to wait for higher gas fees and/or speed of the machines used to perform the mining operations. The time delays between the transactions mined by each miner are accessible via the mining data associated with the block 12. As a simplified example, Table 1 below illustrates how the time delays are determined for the miner A.

TABLE 1

| Transaction Number | Start Time (in HH:MM:SS format) | End Time (in HH:MM:SS format) | Time Gap between Consecutive Transactions |
|---|---|---|---|
| Transaction 1 | 10:00:00 | 10:00:20 | 0 |
| Transaction 2 | 10:00:21 | 10:00:38 | 1 |
| Transaction 3 | 10:00:40 | 10:00:59 | 2 |

Table 1 indicates that the miner A starts mining transaction 1 at 10:00:00 AM and finishes the approval of the transaction 1 at 10:00:20 AM. The miner A then starts mining the next transaction (transaction 2) at 10:00:21 AM and completes transaction 2 at 10:00:38 AM. Thereafter, the miner A starts mining the transaction 3 at 10:00:40 AM and completes transaction 3 at 10:00:59 AM. Overall, the miner A took 59 seconds (the elapsed time between 10:00:00 and 10:00:59) to approve all three transactions. However, for purposes of the present disclosure, the time gaps between the consecutive ones of these transactions are of greater interest. Between the approval of transaction 1 and the start of transaction 2, 1 second has elapsed (i.e., from 10:00:20 and 10:00:21). Between the approval of transaction 2 and the start of transaction 3, 2 seconds have elapsed (i.e., from 10:00:38 and 10:00:40). Therefore, the total amount of time delay between the transactions for miner A is 3 seconds. The total amount of time delay may also be considered a time score, which is equal to the total number of seconds delayed between transactions (e.g., 3 in the case of miner A) in this example.

By accessing the mining data associated with the block 12, a respective time score may be determined for all miners in the manner similar to that discussed above with miner A. However, not all miners will get to approve an equal number of transactions, since the number of transactions mined by each miner depends on the amount or percentage of coins staked by the miner. In order to put all the miners on an equal footing, a respective time delay between the mined transactions for each miner should be normalized as a function of a total number of the blockchain transactions mined by that miner. For example, an extrapolated time score may be calculated for each miner. According to an embodiment, the extrapolated time score=(time score/(number of mined transactions−1)). Using miner A as a simplified example, the time score is 3, the number of mined transactions is 3, and thus the extrapolated time score for miner A=3/(3−1)=1.5. After the extrapolated time score is obtained for each of the miners (which are miners A-J in this case), the miners may be ranked from the best (e.g., having the lowest score) to the worst (e.g., having the highest score) based on their respective extrapolated time scores. Such a ranking reveals who the best miners are in terms of having the least amount of time delay for processing the mined transactions.

A subset of the miners that have acquired a predefined status (or meet a set of specified criteria) is then identified. For example, the status may be acquired by being the top M number of miners that have the best extrapolated time scores. Using miners A-J as a simplified example again, suppose that M is 3, which means that the 3 miners having the lowest extrapolated time scores are identified as miners on the list. In this simple example, the top 3 miners may be miners A, B, C, whose low extrapolated time scores (compared to the rest of the miners D-J) indicate that they have the least time delays when processing or mining the blockchain transactions. In other words, these miners A, B, C may not be as sensitive to the amount of gas fees associated with the mined transactions and are less likely to wait for higher-fee transactions while leaving lower-fee transactions stuck in the mempool.

It is understood that although the example of FIG. 1A uses a small number of miners A-J for the sake of simplicity, the number of miners mining each block may be far greater in actual implementations of the blockchain system 10, where hundreds, if not thousands (or more) of miners may be engaged in the mining of the blocks. As such, the acquired status or the set of specified criteria may be flexibly adjusted based on the circumstances. For example, the list of top miners may be a percentage (e.g., top 20%) of the total miners participating in the mining of a given block of the blockchain, or a fixed number of top miners, regardless of how many miners are actually participating in the mining.

In some embodiments, the list of top miners may not need to be completed only after the entire block is mined. In other words, as the block is being mined, a list of top miners may be generated and/or updated in real-time, or at least periodically, based on how many transactions each miner has mined up to the point the list of top miners is determined. For example, suppose that after 2 hours of mining the block 12, a list of top miners is determined, even though the mining of the block 12 is not yet finished. Thus, the list of top miners may reflect the top miners up to that point of mining (e.g., at the 2-hour mark). Subsequently, another list of top miners may be determined at the 4-hour mark of mining the block 12, and then at the 6-hour mark, so on and so forth. Suppose that at the completion of the mining of the block 12, 8 different lists of top miners are generated, where some of the top miners appear in each list, while some of the top miners may appear in some lists, but not others. Based on the frequency of appearance in the 8 lists, a final list of top miners may be determined. Furthermore, although only one block (e.g., block 12) is used to identify the list of top miners in this simplified example of FIG. 1A, other embodiments may employ several blocks to determine the list of top miners, so as to obtain a top miners list based on a more comprehensive data set. Regardless of how a top miners list is determined, once it is determined, it may be used for the subsequent blockchain mining/processing.

According to embodiments of the present disclosure, the blocks (e.g., the blocks 14-22) mined after the block 12 are mined either by entering an exploitation phase or by entering an exploration phase. In more detail, before each of the subsequent blocks 14-22 is mined, a random number is generated for each block, respectively. The generated random number is compared against a specified numerical threshold, which may also be referred to as epsilon herein. In some embodiments, the value of epsilon is selected to be a value that is greater than 0 but less than 1, for example, 0.3. The random number may be generated using Javascript or PHP integrated generation technology, for example, via the following Javascript code:

```
var randomnumber=Math.floor(Math.random( )*1)
```

where *1 dictates that a number will be randomly generated between 0-1.

If the comparison indicates that the random number generated for the block satisfies a predefined relationship with epsilon, the systems and methods of the present disclosure will enter the exploitation phase, where the mining tasks for that block are assigned to the list of top miners identified based on the mining of the block 12. In some embodiments, the mining tasks are assigned exclusively to the list of miners during the exploitation phase. On the other hand, if the comparison indicates that the random number generated for the block does not satisfy a predefined relationship with epsilon, the systems and methods of the present disclosure will enter the exploration phase, where the mining tasks for that block are assigned miners on the list of top miners as well as miners not on the list of top miners. In some embodiments, the mining tasks are assigned to all available miners in the exploration phase. Stated differently, either the exploitation phase or the exploration phase is entered based on whether a first criterion or a second criterion is satisfied by the relationship between the random number and epsilon, respectively.

As examples to illustrate the above, the mining of blocks 14 and 16 are performed by entering the exploitation phase and the exploration phase, respectively. For example, in some embodiments, the predefined relationship may be satisfied when the value of the random number is greater than the value of epsilon. Suppose that the random number generated for the block 14 is 0.4, which is greater than the epsilon value of 0.3. Hence, the predefined relationship between the random number (for block 14) and epsilon is satisfied, which means that the mining of the block 14 will be performed by entering the exploitation phase.

Since the list of top miners has already been identified as consisting of miners A, B, and C (based on the mining of the block 12), the mining of block 14 will be performed using the miners A, B, and C. In some embodiments, the mining of the block 14 will be done exclusively using the miners A, B, and C, such that the other available miners cannot participate in the mining of the block 14. In other embodiments, the mining of the block 14 will be done by relying on the miners A, B, and C disproportionately more than other miners, even though one or more other miners may still participate in the mining of the block 14 (though to a lesser extent). For example, in some embodiments, the miners A, B, and C may have greater priority in mining of the transactions in block 14 than other miners. In other embodiments, the miners A, B, and C may be allotted to mine a predetermined percentage of the transactions in the block 14 (e.g., 80%), whereas the rest of the transactions in the block 14 may be divided up among the other available miners, even if the number of the available miners may far exceed the number of miners on the list of top miners.

Regardless of the implementation details of the exploitation phase, it is understood that the exploitation is configured in a way to leverage the speed and/or efficiency of the miners that made the top list, so that they contribute to the mining tasks disproportionately more (e.g., sometimes by having exclusivity) than other miners during the exploitation phase. Since the miners on the top list have already demonstrated that they have low transaction delay times (e.g., by their low extrapolated time scores), the mining of the block 14 may be performed quickly and efficiently in the exploitation phase and is unlikely to cause lower-gas-fee transactions to be stuck in the mempool.

Still referring to FIG. 1A, suppose that the random number generated for the block 16 is 0.2, which is less than the epsilon value of 0.3. Hence, the predefined relationship between the random number (for block 16) and epsilon is not satisfied, which means that the mining of the block 16 will be performed by entering the exploration phase. In the exploration phase, mining tasks of the block 16 are assigned not only to the list of top miners (e.g., A, B, and C), but also to at least some of the other available miners. For example, the miners available for mining the block 16 include the miners A, B, C, D, E, F, G, H, I, J, and K. The mining tasks for mining the block 16 may be assigned not just to the miners A, B, and C, but also to one or more of the miners D, E, F, G, H, I, J, and K.

In some embodiments, the mining tasks for mining the block 16 are assigned to all the available miners A-J during the exploration phase. In other embodiments, the mining tasks for mining the block 16 may be assigned to some, but not all, of the available miners during the exploration phase. For example, based on the mining performance of the miners after the block 12 is mined, the participating miners are categorized into a plurality of tiers, such as an upper tier that includes the miners A, B, and C, a middle tier that includes the miner D, E, F, and G, and a lower tier that includes the miners H, I, J, and K. During the exploration phase, the mining tasks may be assigned to the miners in the upper tier (e.g., the miners A, B, and C) as well as the miners in the middle tier (e.g., the miners D, E, F, and G), but not to the miners in the lower tier (e.g., the miners H, I, J, and K).

In some embodiments, a transaction cut-off limit may be implemented for the exploration phase, so as to reduce the likelihood of the 51% attack discussed above, where a group of malicious actors may band together to gain control of more than 50% of a hashing power of a blockchain system. To implement the transaction cut-off limit, each miner will be restricted to no more than a predefined percentage of the total transactions for approval. To illustrate, suppose that 100 miners are ready to stake the coins to participate in the mining of a blockchain, and also suppose that the sum of the coins staked by all the miners is equal to X. In that case, the percentage of transactions allotted to each miner=total coins staked by that miner divided by X. If the above value exceeds a predefined percentage—which is set to 1% in this case—then the percentage of transactions for that miner will be capped at 1%.

Continuing with the above example, suppose that 10 miners (out of 100 miners) have staked 22% of the coins (and therefore allocated 22% of the transactions), but the transaction cut-off limit dictates that these 10 miners should not be allocated more than 10% of the transactions (1% for each miner), then this means that they exceed the transaction cut-off limit by 12% (i.e., 22%-10%). In that case, the 12% of the transactions will be distributed equally among the remaining 90 miners. In other words, the additional transactions allocated to each of the remaining 90 miners is 12%/90=0.13%.

If the transaction limit for each miner is 1%, but there are less than 100 miners in the system (say, 90 miners total), then based on the above approach, all the transactions cannot be equally distributed among themselves (due to the inability of satisfying the 1% limit). In such cases, the remaining transactions will then go into a temporary pool, such that after every miner completes the verification of all the transactions allotted to them, transactions in the temporary pool will be automatically allotted to such miners, for example, one after the other based on their order of completion of verification. By doing so, even if there are fewer miners, the miners are still prevented from taking control of most of the transactions. Such an approach also ensures that all transactions will get verified within the shortest amount of time possible, thereby increasing the processing speed.

Regardless of the implementation details of the exploration phase, it is understood that the exploration phase serves several purposes, including but not limited to:

1. Prevent the miners already in the top list from becoming complacent. Without entering the exploration phase, a miner that made the top list of miners may no longer process the transactions quickly for subsequent blocks and may decide to wait for higher-gas-fee transactions instead, therefore defeating the original purpose of creating the top list of miners.
2. Reward existing miners that did not make the top list of miners but that are performing well recently. Suppose a miner D did not make the original list of top miners when the block 12 was mined, but since then, the mining performance of miner D has been excellent (e.g., having a lower extrapolated time score than at least some of the top miners A, B, or C). Therefore, the miner D should be rewarded by updating the top list of miners by replacing one of the previous miners (e.g., miner B, who is performing worse than miner D now) on the top list with the miner D.
3. Discover new miners that were not available when the block 12 was mined, but that have become available for mining since then. For example, the miner K was not available or did not participate in the mining of the block 12. However, the miner K is an otherwise excellent miner that has low transaction delay times (e.g., would have achieved a lower extrapolated time score than at least some of the existing top miners A, B, or C). Had the list of top miners remained static, it would have missed out on the miner K. By entering the exploration phase, the systems and methods of the present disclosure allow new and excellent-performing miners like K to be discovered, and the list of top miners can then be updated by replacing one of the previous miners (e.g., miner B) on the top list with the miner K.

As a result of processing the block 16 in the exploration phase, the list of top miners is updated by swapping out miners that are no longer performing well (e.g., miners that used to be in the top list but now have high extrapolated time scores) with existing or new miners that are now performing well (e.g., miners that have sufficiently low extrapolated time scores to meet the threshold for making the list of top miners). The updated list of top miners is then used for the mining of subsequent blocks during the exploitation phase.

In the above examples, the value of epsilon determines how frequently the exploration phase is entered, since the exploration phase is entered in response to a comparison between the value of epsilon and the value of the randomly generated number for a given block. As such, if it is desirable to update the list of top miners more frequently, then the value of epsilon may be set higher. On the other hand, if it is desirable to update the list of top miners less frequently, then the value of epsilon may be set lower. In some embodiments, the following algorithm may be used to determine an optimal value of epsilon:

Initial value of Epsilon = 1 (Meaning 100% Exploration Phase)
Initial Value of Average Extrapolated Time Score = 0
(Here, Average Extrapolated Time Score is calculated as the average of the extrapolated time scores of all the miners in the blockchain)
Iteration Number = 1
Random Number Generated by Blockchain (Between 0 and 1) = 0.83
Initial Phase (Exploration vs Exploitation) = Exploration (Because Epsilon > Random Number Generated by Blockchain).
At the end of $1^{st}$ iteration, -continued

```
New Average Extrapolated Time Score = [Sum of Extrapolated Time Score of all
miners / No of Miners]
If [New Average Extrapolated Time Score <= Old Average Extrapolated Time Score]:
        If [Phase == 'Exploration']:
                New epsilon = Old epsilon + 1 / [10 + Iteration Number]
          Else If [Phase =='Exploitation']:
                New epsilon = Old epsilon − 1 / [10 + Iteration Number]
Else If [New Average Extrapolated Time Score > Old Average Extrapolated Time Score]:
        If [Phase == 'Exploration']:
                New epsilon = Old epsilon − 1/[10 + Iteration Number]
          Else If [Phase =='Exploitation']:
                New epsilon = Old epsilon + 1/10 + Iteration Number]
Limit the Epsilon value Between 0 and 1.
Repeat the above process from the Random Number Generation for the next iteration.
New Extrapolated Time Score and New Epsilon from the current iteration will become
Old Extrapolated Time Score and Old Epsilon in the next iteration respectively.
```

In some embodiments, one or more machine learning processes may be utilized to determine the optimal value of epsilon. For example, the machine learning processes may be used to perform the algorithm above. As non-limiting examples, the machine learning process may include Decision Tree, Random Forest, XGBoost, Neural Networks, etc. Alternatively, the process may include optimization algorithms such as Gradient Descent, Thompson Sampling, etc.

In the embodiments above, the predefined relationship between the randomly generated number (for any given block before it is mined) and epsilon is satisfied when the randomly generated number is greater than epsilon, and it is not satisfied when the randomly generated number is less than or equal to epsilon. However, such a predefined relationship is not limiting. For example, in some alternative embodiments, the predefined relationship between the randomly generated number (for any given block before it is mined) and epsilon is satisfied when the randomly generated number is less than epsilon, while the predefined relationship is not satisfied when the randomly generated number is greater than or equal to epsilon. The alternative embodiments may still be able to achieve substantially similar results as the embodiments discussed above merely by flipping the value of epsilon in the alternative embodiments. For example, whereas the value of epsilon is set to 0.3 in the embodiments discussed above, the value of epsilon may be set to 0.7 (e.g., 1-0.3=0.7) in the alternative embodiments to ensure the same results (e.g., how often the exploitation phase or the exploration phase is entered) being achieved. Furthermore, even though the value of epsilon and the value of the randomly generated number are set to vary between 0 and 1 in the above example, they may vary in a different range in other embodiments, for example as a number between 0 and 10, or between 0 and 100, or between −100 and 100, etc. The relationship between epsilon and the randomly generated number may be defined based on the ranges of epsilon and the randomly generated number.

After an N number of blocks of the blockchain system 10 are mined—where N is a positive integer that is greater than or equal to 2—the systems and methods of the present disclosure will perform a complete reset, so as to identify a completely new list of top miners. For example, after every 10,000 blocks have been mined, the value of epsilon will be automatically set to 1 (or another suitable value, depending on the structure of the predefined relationship between epsilon and the randomly generated number), so that the next block to be mined will be forced to enter the exploration phase. FIG. 1A illustrates a simple example of this case, where before the block 18 is mined, epsilon is set to 1 to guarantee that the block 18 will be mined by entering the exploration phase, since the randomly generated number (in a range between 0 and 1) for block 18 is guaranteed to be less than epsilon.

Before the block 18 is mined, some of the previously available miners, such as miners C and F, are no longer participating in the blockchain mining. Meanwhile, one or more new miners, such as the miners L, M, N, O, P, and Q have joined the blockchain system 10 and are available for mining of the block 18. Thus, the full list of available miners at this point is A, B, D, E, G, H, I, J, K, L, M, N, O, P, and Q. The block 18 is mined similar to how block 12 is mined, for example, by utilizing all of the available miners. As was the case for the block 12, the mining data of the block 18 may also be accessed to identify the new list of top miners. Again, the new list of top miners for mining the block 18 may be the miners that have the lowest extrapolated time scores compared to the rest of the miners. For the sake of facilitating the ensuing discussions, the new list of top miners may include the miners B, G, and N. Note that this new list of top miners may share one or more common miners (e.g., miner B) with the initial list of top miners. In some embodiments, the new list of top miners may even be identical to the initial list of top miners. In other embodiments, the new list of top miners may constitute a completely different list of miners than the initial list, such that there are no common miners between the initial list and the new list.

After the new list of top miners is identified after the mining of block 18, the mining of subsequent blocks is also performed either by entering the exploitation phase or by entering the exploration phase. For example, the random number generated for block 20 is greater than epsilon, and thus the block 20 is mined by entering the exploitation phase, similar to the block 14. However, whereas the block 14 was mined by leveraging the original list of top miners A, B, and C, the block 20 is mined by leveraging the new list of top miners B, G, and N. Again, the new top miners B, G, and N may be leveraged by being the exclusive miners for the block 20, or they may be leveraged by being mining a disproportionate number or percentage of transactions (e.g., in comparison to other miners such as miners A, D, E, G, H, J, K, L, M, O, P, and Q). The exploitation phase of mining helps to minimize transaction delay and improve the overall speed and efficiency of blockchain mining.

As another example, the random number generated for block 22 is less than epsilon, and thus the block 22 is mined by entering the exploration phase, similar to the block 16. During the exploration phase, the mining tasks may be assigned to all available miners, such as the miners A, B, D, E, G, H, I, J, K, L, M, N, O, P, and Q. As discussed above, the new list of top miners may be updated based on the mining performances of miners in the exploration phase. In other words, one or more of the miners B, G, N may be replaced by other miners if the other miners have lower extrapolated time scores than the miners B, G, or N. The exploration phase of mining ensures that no miner can become complacent in performing its mining tasks, and that other existing or new miners can get the opportunity to prove that they deserve to make the top list of miners.

In the above example, the value of epsilon may still be set to 0.3 when the blocks 20 and 22 are mined. However, in other embodiments, the value of epsilon need not be the same as when the blocks 14 and 16 were mined. For example, whereas epsilon was set to 0.3 when the blocks 14 and 16 were mined, epsilon may be set to a value between 0 and 1, but not necessarily to 0.3, when the blocks 20 and/or 22 are mined. In other words, a first epsilon value may be used for the mining of the block 14 and 16, while a second (and different) epsilon value may be used for the mining of the blocks 20 and 22.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, the mempool is made up of one or more physical electronic memory storage devices, such as hard disks or RAM on one or more computers. The pending transactions that are stored in the mempool therefore occupy physical electronic storage space, which consumes electronic resources. In addition, CPU power is needed to maintain and/or monitor the mempool and its stored transactions. As such, when a mempool is clogged by transactions (e.g., because the lower-fee transactions are not processed from the mempool fast enough for processing by miners), computer resources such as electronic memory and CPU usage are needlessly wasted. The present disclosure overcomes this problem by removing the transactions (e.g., even the lower-fee transactions) from the mempool quickly, which reduces the unnecessary consumption of electronic memory storage space otherwise required to store the transactions in the mempool and the CPU usage that is otherwise required to maintain and/or monitor the mempool. Fewer transactions stored in the mempool may also lead to faster processing of the transactions in the mempool, thereby further reducing CPU usage.

As another example, the exploitation phase of mining leverages the top mining performers to process the transactions quickly and with little delay, and therefore the mempool of the blockchain is less likely to become clogged, and the overall blockchain system is speedier and more efficient. In addition, the unclogging of the mempool translates into fewer canceled transactions (whereas transactions stuck in the mempool may eventually get canceled by their originators). Generating transactions and cancelling transactions consume network resources (e.g., electronic routing of data packets), hardware resources (e.g., running of one or more CPUs or other hardware processors, or writing data to and from electronic memory), and/or energy resources (e.g., electrical power needed to run the computers and to keep them sufficiently cool. Therefore, eliminating or reducing the likelihood of generating transactions only to have them canceled later (e.g., due to them getting stuck in the mempool) results in a reduction in the waste of the various types of electronic resources discussed above.

Another advantage is improved network security. In certain implementations, blockchain systems may be vulnerable to a type of electronic attack known as the 51% attack. In that regard, the 51% attack refers to an individual mining node or a group of mining nodes controlling more than 50% of a blockchain network's mining power, also known as hash rate or hash power. The hash rate is a measure of the rate at which hashes are being computed on the blockchain network. Hashing may include taking an input string of a given length and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain, Thus, by ensuring that invalid transactions cannot be included in a block, mining nodes increase the reliability of the network. Transactions may be deemed invalid if they attempt to spend more money than is currently owned or engage in double-spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

However, an entity may be able to disrupt the network by gaining control of 50% of a network's hash rate. In a 51% attack, a blockchain node may intentionally reverse or overwrite transactions and engage in double-spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. If not properly addressed, a 51% attack may undermine the security and integrity of the blockchain system. Here, the embodiments of the present disclosure can prevent the occurrence of the 51% attack. This is because in order to successfully perpetrate the 51% attack, the malicious parties need to know their partners ahead of time, so that they can collude together at a specific time to perpetrate the attack. However, since the present disclosure mines each block of a blockchain by randomly entering the exploitation phase or the exploration phase, a malicious party cannot identify its partners with certainty or confidence ahead of time. As such, a malicious party will not be able to successfully carry out the 51% attack, and therefore the electronic security and data integrity of the blockchain system 10 is improved. Other advantages include compatibility with existing blockchain systems and ease and low cost of implementation. The various details of the implementation of a blockchain are discussed below with reference to FIGS. 1B-9.

Computing Architecture

Figure 1B:
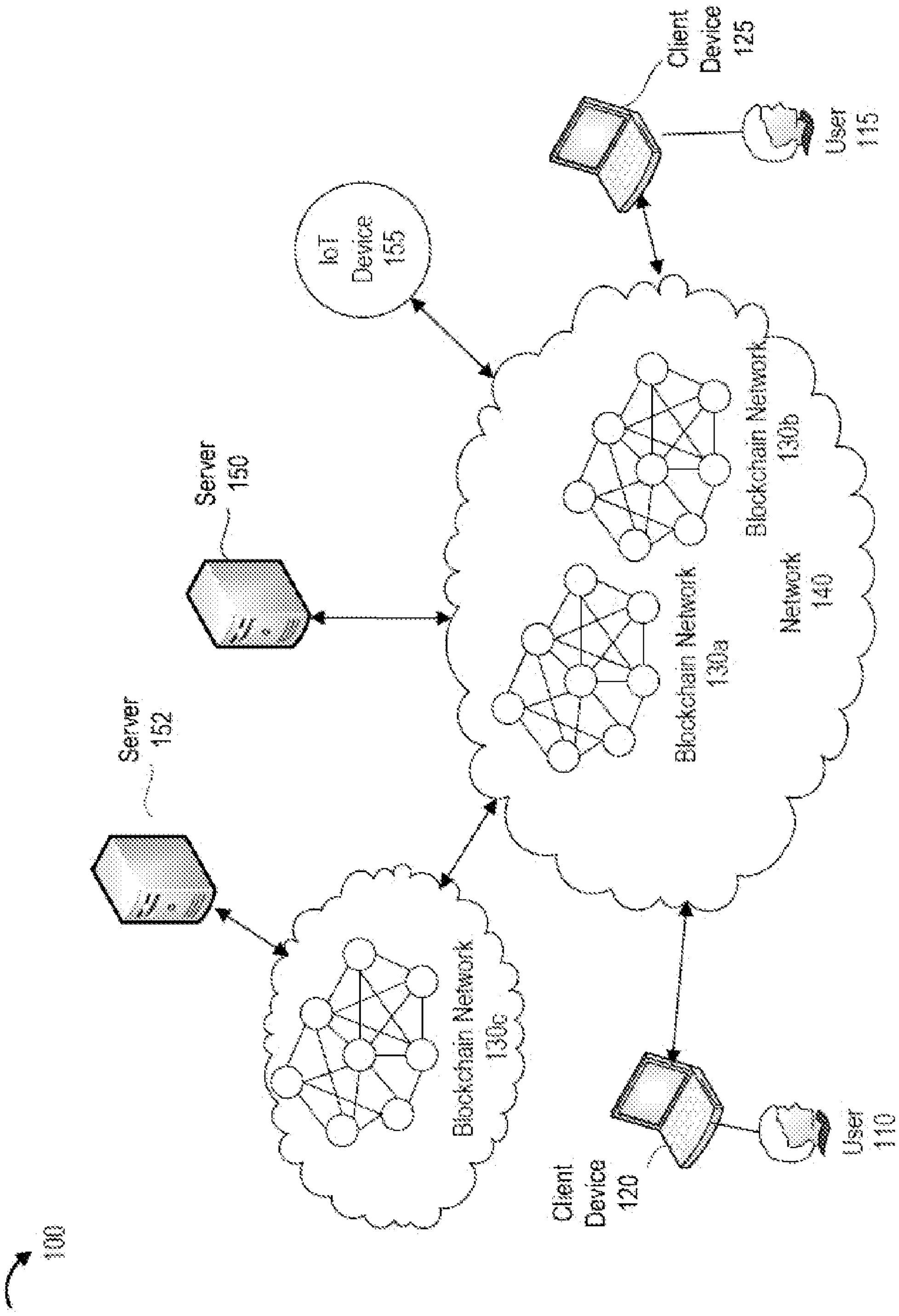
FIG. 1B illustrates an example computing architecture for facilitating one or more blockchain based transactions.

As discussed above, the distributed ledger in a blockchain framework is stored, maintained, and updated in a peer-to-peer network. In one example the distributed ledger maintains a number of blockchain transactions. FIG. 1B shows an example system 100 for facilitating a blockchain transaction. The system 100 includes a first client device 120, a second client device 125, a first server 150, a second server 152, and an Internet of Things (IoT) device 155 interconnected via a network 140. The first client device 120, the second client device 125, the first server 150, and the second server 152 may be a computing device 605 described in more detail with reference to FIG. 6. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain network 130*a-c* (generally referred to as blockchain networks 130). As shown in FIG. 1B, the network 140 may comprise the first and second blockchain networks 130*a* and 130*b*. The third blockchain network 130*c* may be associated with a private blockchain as described below with reference to FIG. 2, and is thus, shown separately from the first and second blockchain networks 130*a* and 103*b*. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1B. The first server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the first server 150. The first server 150 may send the requested transaction to one of the blockchain networks 130 to be validated and approved as discussed below.

Blockchain Network

Figure 2:
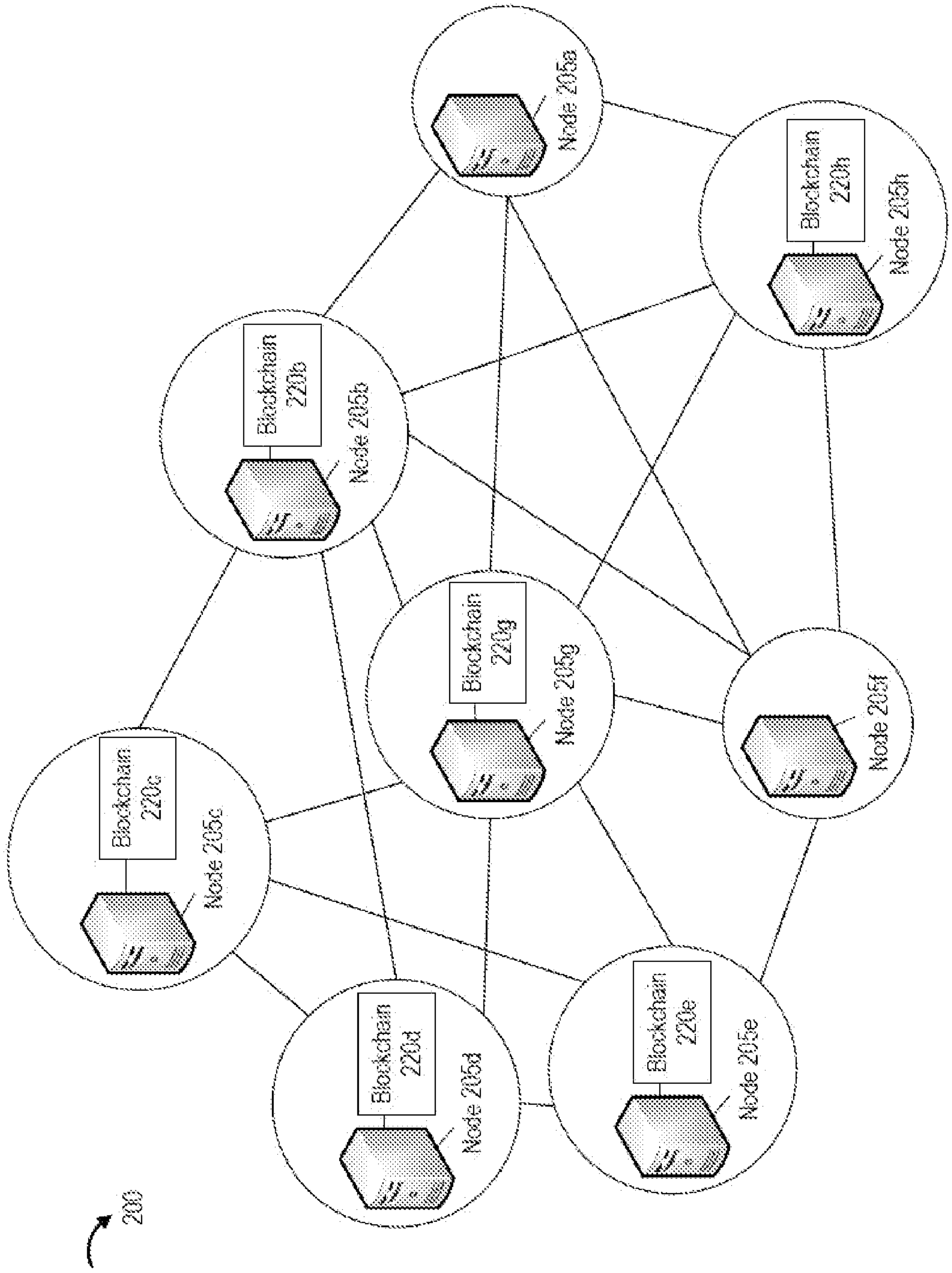
FIG. 2 illustrates an example blockchain network.

FIG. 2 shows an example blockchain network 200 comprising a plurality of interconnected nodes or devices 205*a-h* (generally referred to as nodes 205). Each of the nodes 205 may comprise a computing device 905 described in more detail with reference to FIG. 9. Although FIG. 2 shows a single device, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 2 shows that the nodes 205*b-e* and 205*g-h* store copies of the blockchain 220. The nodes 205*b-e* and 205*g-h* may independently update their respective copies of the blockchain 220 as discussed below.

Blockchain Node Types

Blockchain nodes, for example, the nodes 205, may be full nodes or lightweight nodes. Full nodes, such as the nodes 205*b-e* and 205*g-h*, may act as a server in the blockchain network 200 by storing a copy of the entire blockchain 220 and ensuring that transactions posted to the blockchain 220 are valid. The full nodes 205*b-e* and 205*g-h* may publish new blocks on the blockchain 220. Lightweight nodes, such as the nodes 205*a* and 205*f*, may have fewer computing resources than full nodes. For example, IoT devices often act as lightweight nodes. The lightweight nodes may communicate with other nodes 205, provide the full nodes 205*b-e* and 205*g-h* with information, and query the status of a block of the blockchain 220 stored by the full nodes 205*b-e* and 205*g-h*. In this example, however, as shown in FIG. 2, the lightweight nodes 205*a* and 205*f* may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

Figure 3:
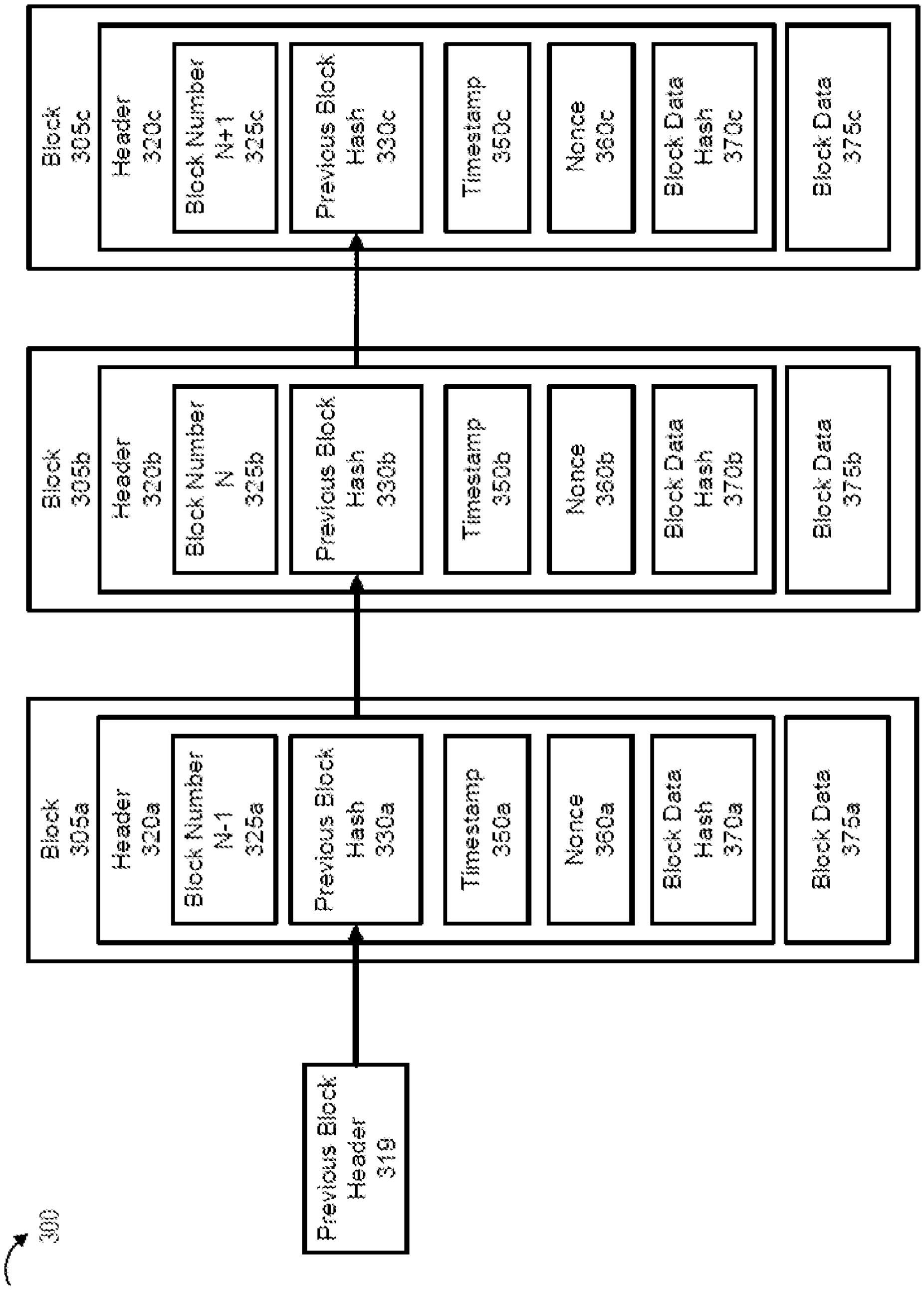
FIG. 3 illustrates an example blockchain.

As discussed above, a blockchain 220 may be associated with a blockchain network 200. FIG. 3 shows an example blockchain 300. The blockchain 300 may comprise a plurality of blocks 305*a*, 305*b*, and 305*c* (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205*b-e* and 205*g-h*, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320*a*, 320*b*, and 320*c* (generally referred to as headers 320) and block data 375*a*, 375*b*, and 375*c* (generally referred to as block data 375). The headers 320 may comprise metadata associated with their respective blocks 305. For example, the headers 320 may comprise a respective block number 325*a*, 325*b*, and 325*c*. As shown in FIG. 3, the block number 325*a* of the block 305*a* is N−1, the block number 325*b* of the block 305*b* is N, and the block number 325*c* of the block 305*c* is N+1. The headers 320 of the blocks 305 may include a data field comprising a block size (not shown).

The blocks 305 may be linked together and cryptographically secured. For example, the header 320*b* of the block N (block 305*b*) includes a data field (previous block hash 330*b*) comprising a hash representation of the previous block N−1's header 320*a*. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320*c* of the block N+1 (block 305*c*) includes a data field (previous block hash 330*c*) comprising a hash representation of block N's (block 305*b*) header 320*b*.

The headers 320 of the blocks 305 may also include data fields comprising a hash representation of the block data, such as the block data hash 370*a-c*. The block data hash 370*a-c* may be generated, for example, by a Merkle tree and by storing the hash or by using a hash that is based on all of the block data. The headers 320 of the blocks 305 may comprise a respective nonce 360*a*, 360*b*, and 360*c*. In some implementations, the value of the nonce 360*a-c* is an arbitrary string that is concatenated with (or appended to) the hash of the block. The headers 320 may comprise other data, such as a difficulty target.

The blocks 305 may comprise a respective block data 375*a*, 375*b*, and 375*c* (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1B, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
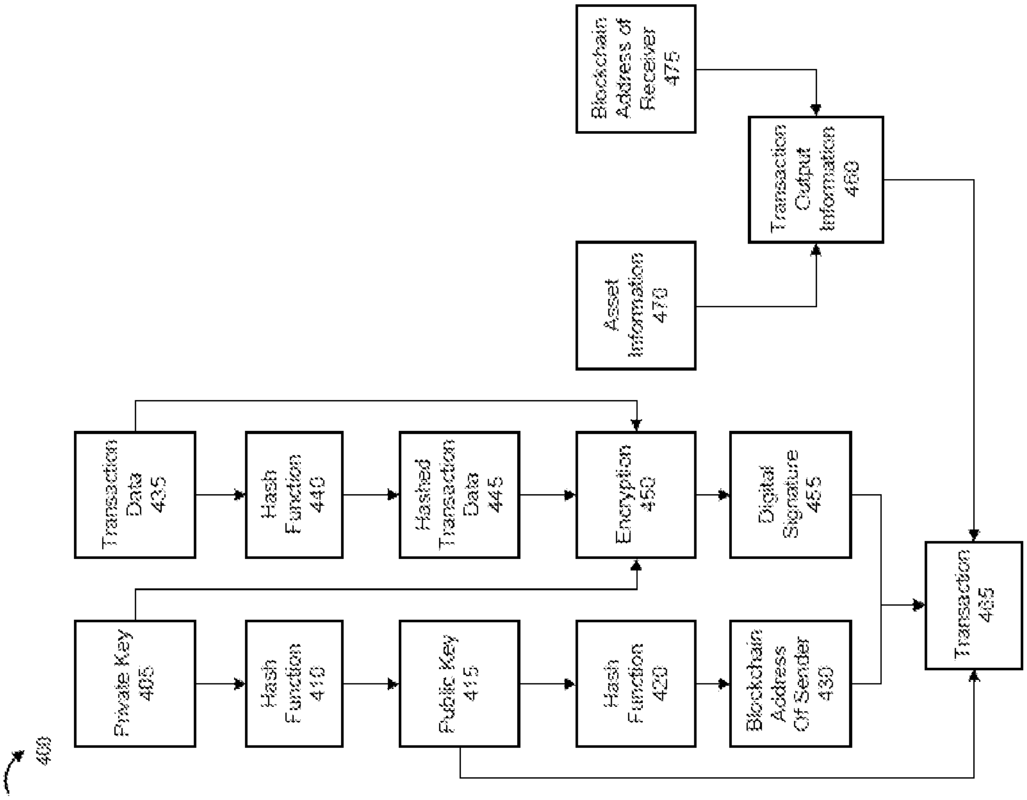
FIG. 4 is a diagram of an example transaction message.

FIG. 4 is a diagram 400 of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 475, such as the blockchain address of receiver 475. The transaction 465 may be sent from the client device 125 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
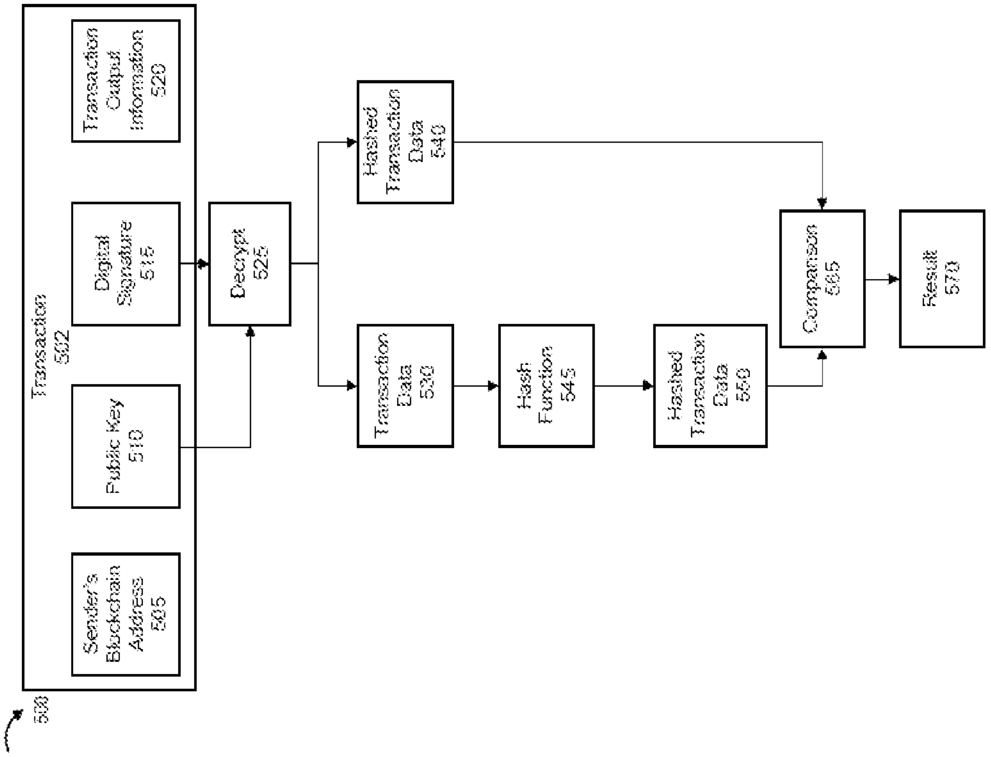
FIG. 5 shows an example transaction broadcast the blockchain network.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 5 shows a block diagram 500 illustrating an example transaction 502 broadcast by the first server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g., turned on or off) to address issues such as latency, scalability, and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt 525 the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node **205*a* may create a first block comprising transactions "A," "B," and "C." Another full node 205*b*** may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions. In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to electronic attacks such as the 51% attack described above. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as a the blockchain 130*a* in FIG. 1B. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130*a* may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Machine Learning

Figure 6:
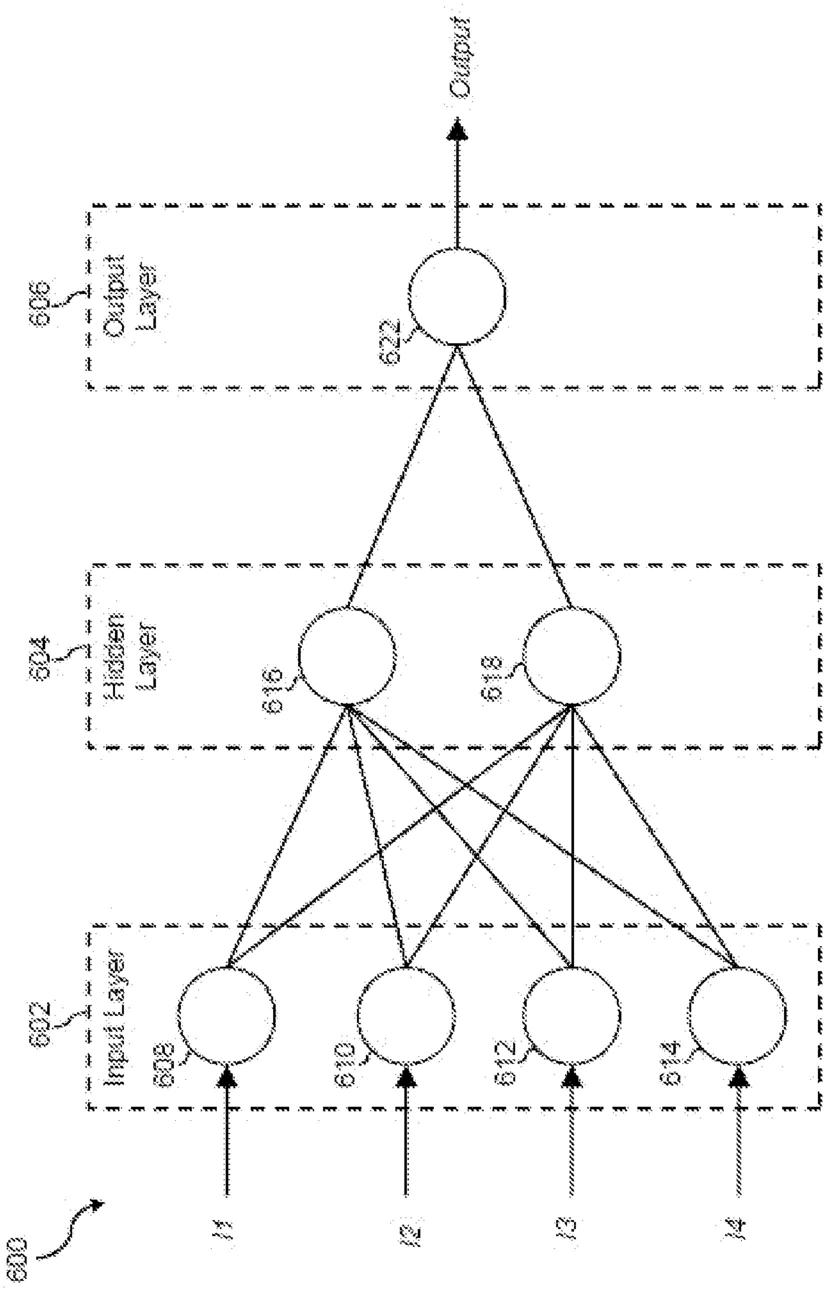
FIG. 6 illustrates an example neural network for machine learning.

As discussed above, machine learning is used to learn and make predictions according various aspect of the present disclosure. For example, machine learning may be employed to determine an optimum value of epsilon. In some embodiments, such a machine learning process may be performed at least in part via an artificial neural network, which may be used to determine the optimum value of epsilon. In that regard, FIG. 6 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the machine learning module 260, and the machine learning module 260 may include as many hidden layers as necessary. In this example, the artificial neural network 600 receives a set of input values and produces an output value. Each node in the input layer 602 may correspond to a distinct input value.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the machine learning module 260, the output value produced by the artificial neural network 600 may indicate a likelihood of an event.

The artificial neural network 600 may be trained by using training data. For example, the training data herein may be the features extracted from historical data. By providing training data to the artificial neural network 600, the nodes 616-618 in the hidden layer 604 may be trained (adjusted) such that an optimal output (e.g., determining a value for a threshold such as epsilon) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm-which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Flowcharts

Figure 7A:
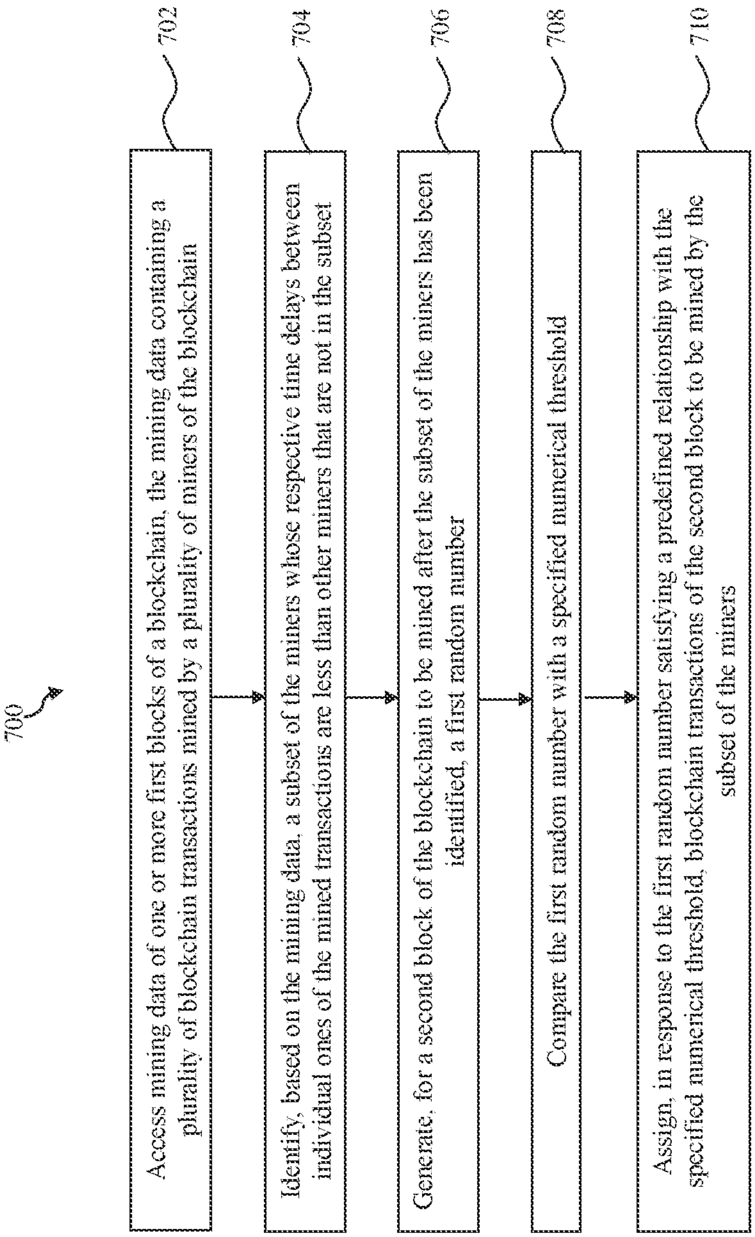
FIG. 7A is a flow diagram showing steps of an example method for performing blockchain mining according to various aspects of the present disclosure.

FIG. 7A is a flowchart illustrating a method 700 for mining a blockchain according to various aspects of the present disclosure. The method 700 includes a step 702 to access mining data of one or more first blocks of a blockchain. The mining data contains a plurality of blockchain transactions mined by a plurality of miners of the blockchain.

The method 700 includes a step 704 to identify, based on the mining data, a subset of the miners whose respective time delays between individual ones of the mined transactions are less than other miners that are not in the subset.

The method 700 includes a step 706 to generate, for a second block of the blockchain to be mined after the subset of the miners has been identified, a first random number.

The method 700 includes a step 708 to compare the first random number with a specified numerical threshold.

The method 700 includes a step 710 to assign, in response to the first random number satisfying a predefined relationship with the specified numerical threshold, blockchain transactions of the second block to be mined by the subset of the miners.

In some embodiments, the plurality of blockchain transactions is retrieved from an electronic mempool of the blockchain.

In some embodiments, the blockchain transactions of the second block are assigned to be mined exclusively by the subset of the miners.

In some embodiments, according to the predefined relationship, the first random number is greater than the specified numerical threshold.

In some embodiments, the respective time delay between the mined transactions for each miner is normalized as a function of a total number of the blockchain transactions mined by said miner.

In some embodiments, the steps 702-710 are performed using one or more hardware processors.

It is understood that, in some embodiments, one particular system or device may execute all of the steps 702-710. In some other embodiments, that particular system or device may execute a portion or a subset (but not all) of the steps 702-710, and that multiple systems or devices may collectively execute the steps 702-710.

It is also understood that additional method steps may be performed before, during, or after the steps 702-710 discussed above. For example, the method 700 may include a step of verifying that each of the miners has staked a respective amount of a blockchain asset as a collateral for mining the plurality of blockchain transactions. As another example, the method 700 may include a step of determining the specified numerical threshold via a machine learning process. As yet another example, the method 700 may include the following steps: generating, for a third block of the blockchain to be mined after the subset of the miners has been identified, a second random number; comparing the second random number with the specified numerical threshold; and assigning, in response to the second random number not satisfying the predefined relationship with the specified numerical threshold, blockchain transactions of the third block to be mined by the subset of the miners as well as miners who are not in the subset. As yet a further example, the method 700 may also include the following steps: accessing mining data of the third block; identifying, based on the accessing of the mining data of the third block, one or more first miners whose respective time delays between the mined transactions are less than one or more second miners in the subset of the miners; and updating the subset of the miners by replacing the one or more second miners with the one or more first miners. In some other embodiments, at least some of the one or more first miners did not participate in mining the one or more first blocks of the blockchain. As another example, the method 700 may include the following steps: determining that an N number of blocks of the blockchain has been mined; repeating, for one or more blocks of the blockchain subsequent to the N number of blocks, the accessing and the identifying until a new subset of the miners has been identified; generating, for a fourth block of the blockchain to be mined after the new subset of the miners has been identified, a third random number; comparing the third random number with the specified numerical threshold; and assigning, in response to the third random number satisfying the predefined relationship with the specified numerical threshold, blockchain transactions of the fourth block to be mined by the new subset of the miners. In some embodiments, the method 700 may also include the following steps: generating, for a fifth block of the blockchain to be mined after the new subset of the miners has been identified, a fourth random number; comparing the fourth random number with the specified numerical threshold; and assigning, in response to the fourth random number not satisfying the predefined relationship with the specified numerical threshold, blockchain transactions of the fifth block to be mined by the new subset of the miners as well as miners who are not in the new subset. For reasons of simplicity, other additional steps are not discussed in detail herein.

Figure 7B:
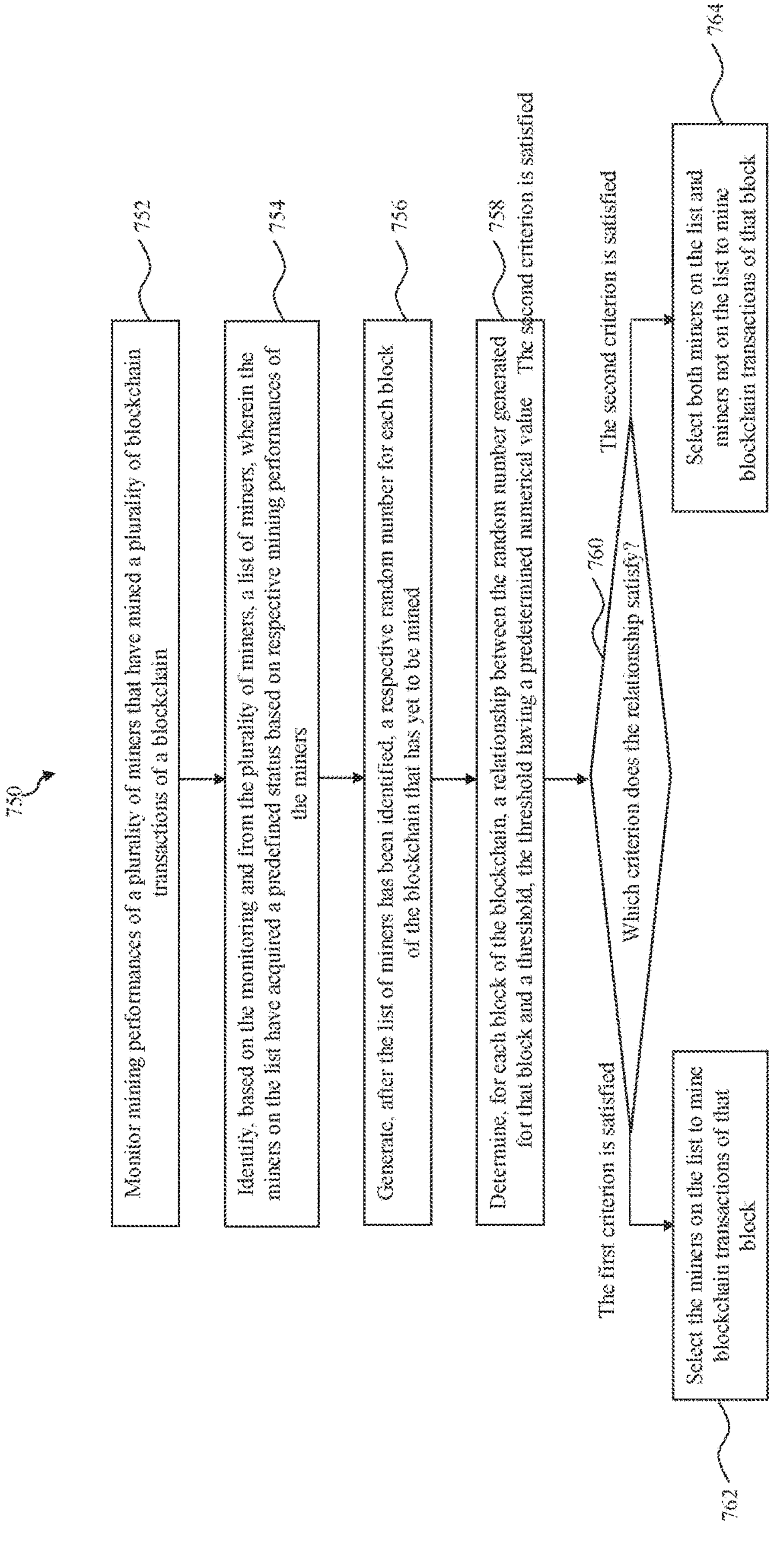
FIG. 7B is a flow diagram showing steps of an example method for performing blockchain mining according to various aspects of the present disclosure.

FIG. 7B is a flowchart illustrating a method 750 for mining a blockchain according to various aspects of the present disclosure. The method 750 includes a step 752 to monitor mining performances of a plurality of miners that have mined a plurality of blockchain transactions of a blockchain.

The method 750 includes a step 754 to identify, based on the monitoring and from the plurality of miners, a list of miners, wherein the miners on the list have acquired a predefined status based on respective mining performances of the miners.

The method 750 includes a step 756 to generate, after the list of miners has been identified, a respective random number for each block of the blockchain that has yet to be mined.

The method 750 includes a step 758 to determine, for each block of the blockchain, a relationship between the random number generated for that block and a threshold, the threshold having a predetermined numerical value.

The method 750 includes a decision step 760 to determine which criterion (e.g., a first criterion or a second criterion) is satisfied by the relationship between the random number and the threshold. If the answer from the decision step 760 is that the relationship satisfies the first criterion, then the method 750 proceeds to a step 762 to select the miners on the list to mine blockchain transactions of that block. If the answer from the decision step 764 is that the relationship satisfies the second criterion, then the method 750 proceeds to a step 764 to select both miners on the list and miners not on the list to mine blockchain transactions of that block.

In some embodiments, the predefined status is achieved at least in part by having a shorter time delay between transactions than other miners that are not on the list, the determining the relationship comprises determining whether the random number is greater than, less than, or equal to the threshold, the first criterion is satisfied when the random number is greater than the threshold, and the second criterion is satisfied when the random number is less than or equal to the threshold.

It is understood that, in some embodiments, one particular system or device may execute all of the steps 752-764. In some other embodiments, that particular system or device may execute a portion or a subset (but not all) of the steps 752-764, and that multiple systems or devices may collectively execute the steps 752-764.

It is also understood that additional method steps may be performed before, during, or after the steps 752-764 discussed above. For example, the method 750 may include a step of updating the list for each block at least in part by replacing one or more miners who have lost the predefined status with one or more miners who have achieved the predefined status. As another example, the method 750 may include the following steps: after a predetermined number of blocks have been mined, temporarily adjusting a numerical value of the threshold for a period of time such that the second criterion is guaranteed to be satisfied during the period of time; determining a new list of miners that have acquired the predefined status during the period of time; reverting the threshold to the predetermined numerical value after the new list of miners has been determined; and for blocks to be mined after the new list of miners has been determined, repeating the generating, the determining, and the performing one of the following actions while the new list is used. For reasons of simplicity, other additional steps are not discussed in detail herein.

Computing Device

Figure 8:
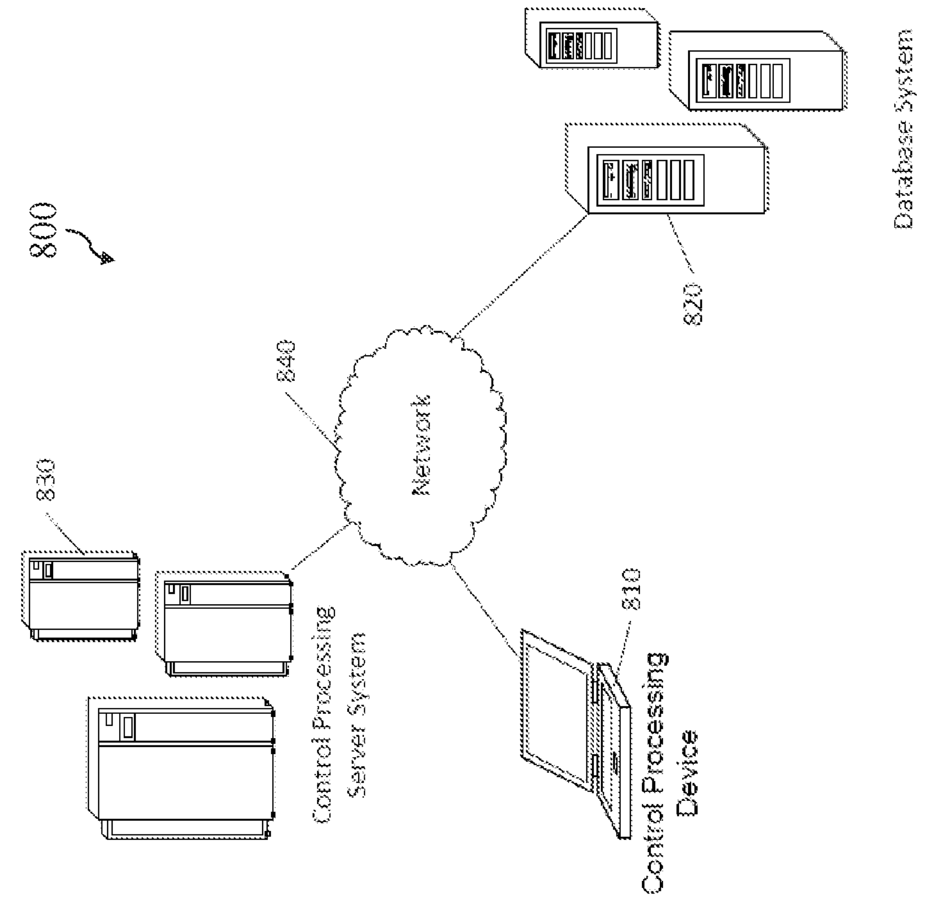
FIG. 8 illustrates an example system.

FIG. 8 shows a system 800. The system 800 may include at least one client device 810, at least one database system 820, and/or at least one server system 830 in communication via a network 840. It will be appreciated that the network connections shown are illustrative and any means of establishing a communications link between the computers may be used. The existence of any of various network protocols such as TCP/IP, Ethernet, FTP, HTTP, and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 8.

Client device 810 may access server applications and/or resources using one or more client applications (not shown) as described herein. Client device 810 may be a mobile device, such as a laptop, smart phone, mobile phones, or tablet, or computing devices, such as a desktop computer or a server, wearables, embedded devices. Alternatively, client device 810 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 820 may be configured to maintain, store, retrieve, and update information for server system 830. Further, database system may provide server system 830 with information periodically or upon request. In this regard, database system 820 may be a distributed database capable of storing, maintaining, and updating large volumes of data across clusters of nodes. Database system 820 may provide a variety of databases including, but not limited to, relational databases, hierarchical databases, distributed databases, in-memory databases, flat file databases, XML databases, NoSQL databases, graph databases, and/or a combination thereof.

Server system 830 may be configured with a server application (not shown) that is capable of interfacing with client application and database system 820 as described herein. In this regard, server system 830 may be a standalone server, a corporate server, or a server located in a server farm or cloud-computer environment. According to some examples, server system 830 may be a virtual server hosted on hardware capable of supporting a plurality of virtual servers.

Network 840 may include any type of network. For example, network 840 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 800 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 800. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 800 in front of one or more computing devices such that any external devices may communicate directly with the specialized hardware.

Figure 9:
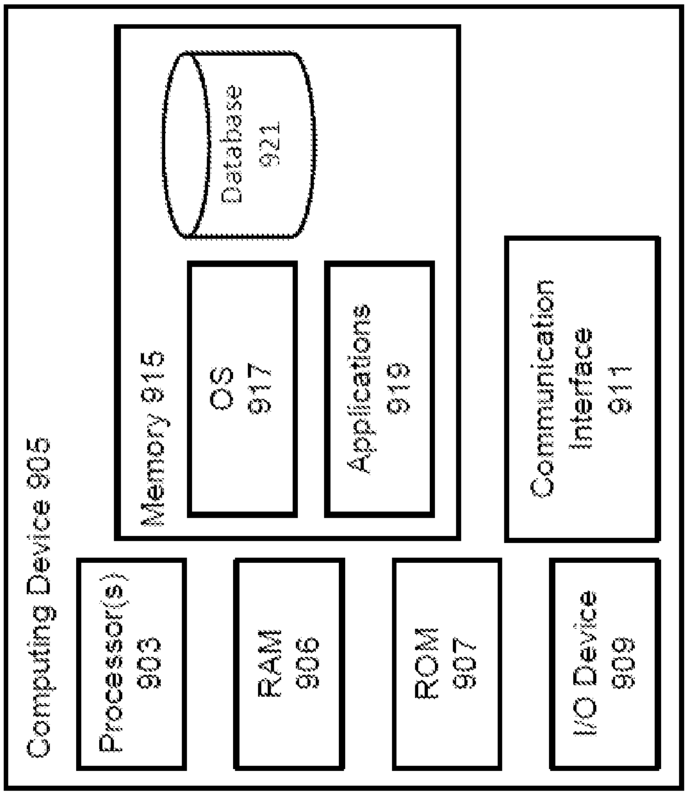
FIG. 9 illustrates an example computing device.

Turning now to FIG. 9, a computing device 905 that may be used with one or more of the computational systems is described. The computing device 905 may include a processor 903 for controlling overall operation of the computing device 905 and its associated components, including RAM 906, ROM 907, input/output device 909, communication interface 911, and/or memory 915. A data bus may interconnect processor(s) 903, RAM 906, ROM 907, memory 915, I/O device 909, and/or communication interface 911. In some embodiments, computing device 906 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 909 may include a microphone, keypad, touch screen, and/or stylus motion, gesture, through which a user of the computing device 905 may provide input, and may also include one or more of a speaker for providing audio output and a video display device for providing textual, audiovisual, and/or graphical output. Software may be stored within memory 915 to provide instructions to processor 903 allowing computing device 905 to perform various actions. For example, memory 915 may store software used by the computing device 905, such as an operating system 917, application programs 919, and/or an associated internal database 921. The various hardware memory units in memory 915 may include volatile and nonvolatile, removable and non-removable media implemented in any method or technology for storage of information such as computer-readable instructions, data structures, program modules, or other data. Memory 915 may include one or more physical persistent memory devices and/or one or more non-persistent memory devices. Memory 915 may include, but is not limited to, random access memory (RAM) 906, read only memory (ROM) 907, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 903.

Communication interface 911 may include one or more transceivers, digital signal processors, and/or additional circuitry and software for communicating via any network, wired or wireless, using any protocol as described herein.

Processor 903 may include a single central processing unit (CPU), which may be a single-core or multi-core processor, or may include multiple CPUs. Processor(s) 903 and associated components may allow the computing device 905 to execute a series of computer-readable instructions to perform some or all of the processes described herein. Although not shown in FIG. 9, various elements within memory 915 or other components in computing device 905, may include one or more caches, for example, CPU caches used by the processor 903, page caches used by the operating system 917, disk caches of a hard drive, and/or database caches used to cache content from database 921. For embodiments including a CPU cache, the CPU cache may be used by one or more processors 903 to reduce memory latency and access time. A processor 903 may retrieve data from or write data to the CPU cache rather than reading/writing to memory 915, which may improve the speed of these operations. In some examples, a database cache may be created in which certain data from a database 921 is cached in a separate smaller database in a memory separate from the database, such as in RAM 906 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 905 are described separately, functionality of the various components may be combined and/or performed by a single component and/or multiple computing devices in communication without departing from the invention.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:

accessing historical information associated with a mining of a blockchain in a first time period by a plurality of miners, wherein the first time period corresponds to an exploration phase in which the mining is performed by each miner of the plurality of miners;

evaluating, based on the historical information, a performance of each of the miners in the plurality of miners according to one or more specified criteria;

determining, based on the evaluating, that the performance of one or more first miners of the plurality of miners exceeds a rest of the plurality of miners according to the one or more specified criteria; and assigning the one or more first miners with a higher priority over the rest of the plurality of miners for the mining of the blockchain in a second time period that occurs after the first time period, wherein the second time period corresponds to an exploitation phase in which the mining is performed by the assigned one or more first miners, but not by the rest of the plurality of miners.

2. The method of claim 1, wherein:

the mining of the blockchain in the first time period comprises mining transactions that are in a mempool but have not been written to the blockchain yet; and the evaluating comprises evaluating the performance of each of the miners of the plurality of miners with respect to the mining of the transactions that are in the mempool.

3. The method of claim 2, wherein:

the one or more specified criteria comprise a time delay of each of the miners of the plurality of miners in the mining of the transactions that are in the mempool; and the one or more first miners have a smaller time delay than the rest of the plurality of miners in the mining of the transactions that are in the mempool.

4. The method of claim 2, wherein:

the one or more specified criteria comprise a tendency of each of the miners of the plurality of miners to not mine transactions in the mempool that have a mining fee below a threshold; and the one or more first miners have a lower tendency than the rest of the plurality of miners to not mine the transactions in the mempool that have the mining fee below the threshold.

5. The method of claim 1, wherein:

the method is performed in a plurality of cycles, and wherein each cycle of the plurality of cycles comprises the exploration phase and the exploitation phase.

6. The method of claim 1, wherein mining tasks associated with the mining of the blockchain are assigned substantially evenly among the plurality of miners in the exploration phase.

7. The method of claim 1, wherein the method is performed without the plurality of miners knowing whether they are mining in the exploitation phase or in the exploration phase.

8. The method of claim 1, wherein a new group of the one or more first miners is identified in each exploration phase.

9. The method of claim 1, wherein the exploration phase or the exploitation phase is entered into based on a comparison between a randomly generated number and a specified threshold.

10. The method of claim 9, wherein the specified threshold is determined via a machine learning process.

11. The method of claim 1, wherein the one or more first miners are prioritized by being assigned as one or more exclusive miners for mining the blockchain in the second time period.

12. The method of claim 1, wherein the one or more first miners are prioritized by being each assigned a disproportionate percentage of mining tasks associated with the mining of the blockchain compared to the rest of the plurality of miners in a future time period, and wherein the disproportionate percentage is less than 50%.

13. A system, comprising:

a non-transitory memory storing instructions; and a processor configured to execute the instructions to cause the system to perform operations comprising:

accessing mining information associated with a mining of a blockchain by a plurality of miners, wherein the mining is performed during an exploration phase of a mining cycle, wherein in the exploration phase, the mining is performed by each miner of the plurality of miners;

identifying, based on the mining information, a subset of the plurality of miners whose mining performance meets one or more specified criteria;

determining, at least in part based on a randomly generated number, that an exploitation phase of the mining cycle should be entered, wherein in the exploitation phase, the mining is performed disproportionately by a particular group of miners; and assigning the subset of the plurality of miners to be the particular group of miners to perform a disproportionately higher number of mining tasks during the exploitation phase.

14. The system of claim 13, wherein the operations further comprise repeating the mining cycle a plurality of times, wherein a new subset of the plurality of miners is identified and assigned with the disproportionately higher number of mining tasks in each new mining cycle.

15. The system of claim 13, wherein the one or more specified criteria comprise an amount of time delay less than a specified threshold when transactions are mined out of a mempool.

16. The system of claim 13, wherein the determining is performed at least in part by comparing the randomly generated number with a numerical value that was determined at least in part via machine learning.

17. A non-transitory machine-readable medium having instructions stored thereon, the instructions executable to cause a machine to perform operations comprising:

gathering mining data associated with a mining of transactions in a mempool of a blockchain in an exploration mining phase, wherein the mining of transactions is performed by all available miners of a plurality of miners;

evaluating, based on the mining data, a performance of each of the available miners of the plurality of miners during the exploration mining phase according to one or more specified criteria;

selecting, based on a result of the evaluating, a subset of the plurality of miners that should be given a greater priority during an exploitation mining phase in which the mining of transactions is performed disproportionately by different groups of miners in the plurality of miners;

determining, based on a comparison of a randomly generated number and a specified threshold, that the exploitation mining phase should begin; and executing the exploitation mining phase, in which the selected subset of the plurality of miners perform the mining with the greater priority than a rest of the miners in the plurality of miners.

18. The non-transitory machine-readable medium of claim 17, wherein the one or more specified criteria comprise how quickly transactions with a transaction fee below a specified amount are mined by each miner of the plurality of miners.

19. The non-transitory machine-readable medium of claim 17, wherein the greater priority is given by assigning a disproportionately higher number of mining tasks to the selected subset of the plurality of miners.

20. The non-transitory machine-readable medium of claim 17, wherein the greater priority is given by assigning an entirety of available mining tasks to the selected subset of the plurality of miners.

* * * * *